B. O. HANK.
FLY SHIELD FOR SCREEN DOORS.
APPLICATION FILED JAN. 3, 1912.
1,031,548.
Patented July 2, 1912.
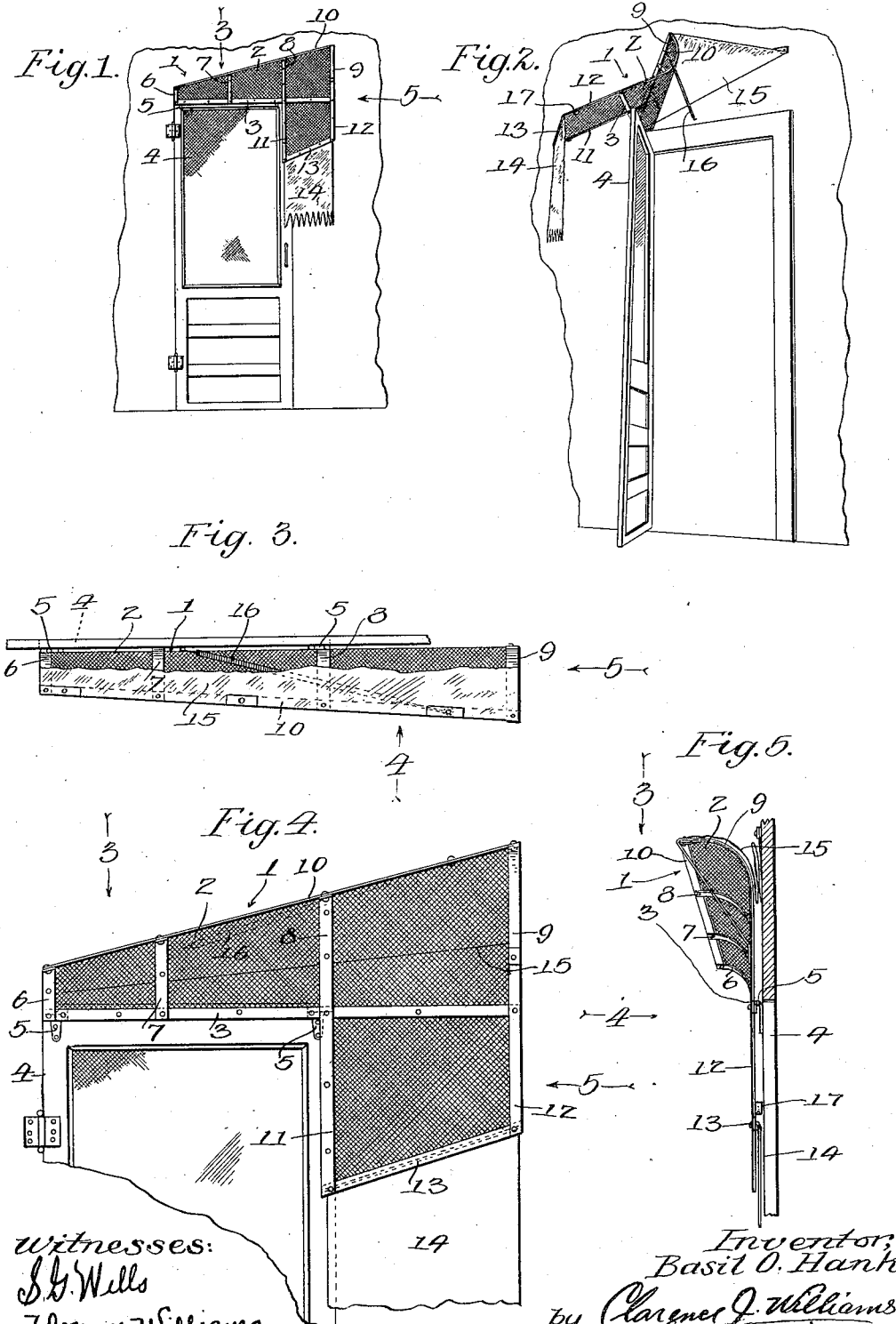
Witnesses:
J. G. Wells
Florence Williams
Inventor:
Basil O. Hank
by Clarence J. Williams
his Attorney.
COLUMBIA PLANOGRAPH CO., WASHINGTON, D. C.

UNITED STATES PATENT OFFICE.

BASIL O. HANK, OF LOS ANGELES, CALIFORNIA.

FLY-SHIELD FOR SCREEN-DOORS.

1,031,548.  Specification of Letters Patent.  Patented July 2, 1912.

Application filed January 3, 1912. Serial No. 669,154.

*To all whom it may concern:*

Be it known that I, BASIL O. HANK, a citizen of the United States, residing at Los Angeles, California, have invented a new and useful Fly-Shield for Screen-Doors, of which the following is a specification.

The object of this invention is to provide a simple and efficient device which may be attached to any screen door to prevent flies or other insects from entering the house attendant to the opening and closing of doors, and consists of the novel features herein shown, described and claimed.

The accompanying drawings illustrate the invention.

Figure 1 is a front elevation of my fly shield mounted in place upon a screen door. Fig. 2 is a fragmental perspective view showing the device as it would appear when the door is thrown open. Fig. 3 is a top plan view upon an enlarged scale as seen looking in the direction indicated by the arrow 3 in Figs. 1, 4 and 5. Fig. 4 is a fragmentary front elevation upon an enlarged scale as seen looking in the direction indicated by the arrow 4 in Figs. 3 and 5. Fig. 5 is a fragmentary end elevation upon an enlarged scale as seen looking in the direction indicated by the arrow 5 in Figs. 1, 3 and 4.

Referring to the drawings in detail, my invention consists of a frame 1, preferably constructed of strap iron and covered with a screen body 2, said frame comprising a horizontal main or supporting bar 3 hingedly secured to the top portion of the door 4 by hinges 5, said bar 3 being longer than the width of the door 4 and provided with upwardly extending, outwardly curved ribs 6, 7, 8 and 9, said ribs being riveted at their upper ends to a ridge bar 10, said bar 10 being approximately at a 30° angle to the supporting bar 3. The ribs 8 and 9 are provided with downwardly extending portions 11 and 12, and are connected together at their lower ends by a cross bar 13, a fly agitator 14 preferably made of canvas is secured to said cross bar and extends downwardly therefrom.

A V shaped covering 15 of canvas is secured upon one side to the ridge bar 10 and upon the other side to the door casing, and is of such a configuration that when the door is opened to a certain distance, the cover becomes taut and limits the further outward movement of the door. A retractile coil spring 16 is attached at one end to the ridge bar 10 and extends backwardly and is attached at its other end to the door frame so that when the door 4 is opened, the spring 16 will pull backwardly on the ridge bar 10, thus tilting the frame 1 and throwing the fly agitator 14 forwardly. When the frame 1 is nearly in a horizontal position, as shown in Fig. 1, the spring 16 will yield until the canvas 15 is spread to its limit. When the door is released and swings closed, the frame 1 will resume its vertical position. Buffers 17 may be attached to the back side of the bars 11 and 12, to prevent the device from slamming back against the door frame when the door is closing.

The device when in normal position, that is when the door is closed, remains in a vertical position, as shown in Figs. 1, 4 and 5, but so soon as the door is opened the frame 1 is carried outwardly in an arc and by virtue of the spring 16 is given a sudden jerk and tilted upon its hinges, as shown in Fig. 2, thereby flapping the agitator portion 14 and frightening away any flies which may be upon the screen door or thereabout and also effectively preventing them from entering at the top over the door. The device as shown is attached to a left-hand door but it is obvious by reversing the construction, it may be made applicable to a right-hand door.

I do not wish to limit myself to the exact construction herein shown, as it is obvious that many changes may be made in the details without departing from the spirit of my invention.

I claim:

1. A fly shield comprising, a frame hingedly connected to the upper end of the door and extending backwardly; a fly agitator extending downwardly from the frame; and a retractile coil spring connecting the upper part of the frame to the outer casing, so that when the door is opened the tension of the spring will tilt the frame and throw the fly agitator forwardly.

2. A fly shield adapted to be attached to a screen door, comprising a frame hingedly mounted upon said door, a screen body upon said frame, a fly agitator extending downwardly from said frame beside the door and a retractile coil spring means connected to said frame and to the door frame so that when the door is opened the tension of the spring will tilt the frame.

3. A fly shield adapted to be attached to a screen door, comprising a frame hingedly mounted upon the door and extending horizontally, a fly agitator extending downwardly from said frame, a cover secured to said frame and to the door frame and a retractile coil spring secured to said frame so that when the door is opened the frame will be tilted.

4. A fly shield comprising an L shaped frame adapted to be hingedly attached to a screen door, a screen body mounted upon the frame and extending horizontally, a fly agitator secured to a portion of said frame, a retractile coil spring attached to one end of said frame and to the door frame so that when the door is opened the tension of the spring will tilt said frame, a cover mounted over the door between said frame and the door frame and adapted to cover the space over the door when in open position and limit the outward movement thereof.

BASIL O. HANK.

Witnesses:
CLARENCE J. WILLIAMS,
A. S. MAYNARD.

---

Copies of this patent may be obtained for five cents each, by addressing the "Commissioner of Patents, Washington, D. C."